(12) United States Patent
Hurt

(10) Patent No.: US 6,315,310 B1
(45) Date of Patent: Nov. 13, 2001

(54) PORTABLE VESSEL RECEPTACLE

(75) Inventor: Daniel P. Hurt, Edina, MN (US)

(73) Assignee: Product Marketing Junction, Inc., Farmington, MN (US)

( * ) Notice: Subject to any disclaimer, the term of this patent is extended or adjusted under 35 U.S.C. 154(b) by 0 days.

(21) Appl. No.: 09/359,540

(22) Filed: Jul. 22, 1999

(51) Int. Cl.[7] ........................................... B62B 1/26
(52) U.S. Cl. ..................... 280/79.5; 224/904; 206/373
(58) Field of Search ..................... 280/79.5, 79.2, 280/47.26, 47.19; 224/904; 206/372, 373; 220/735

(56) References Cited

U.S. PATENT DOCUMENTS

| | | | |
|---|---|---|---|
| 2,865,647 | * 12/1958 | Wilson | 280/47.35 |
| 3,834,725 | * 9/1974 | Luoni | 280/79.2 |
| 3,845,968 | 11/1974 | Larson . | |
| 5,088,751 | 2/1992 | Zint . | |
| 5,472,220 | * 12/1995 | Stephan | 280/79.5 |
| 5,833,095 | * 11/1998 | Russell et al. | 280/904 |
| 5,988,658 | * 11/1999 | Ritchie et al. | 280/47.26 |
| 6,053,516 | * 4/2000 | Ottaway | 280/79.5 |
| 6,135,467 | * 10/2000 | Tagariello | 280/79.5 |

* cited by examiner

Primary Examiner—Douglas Hess
Assistant Examiner—Elaine Gort
(74) Attorney, Agent, or Firm—Haugen Law Firm PLLP

(57) ABSTRACT

A portable vessel receptacle which includes a combination of a frame, preferably a wheeled frame supporting a bucket container or vessel. The vessel is a generally cylindrical open top receiver having a lifting handle, and optionally being provided with a fabric tool carrying cowl. The lower portion of the bucket is releasably secured to the frame by means of a positionally adjustable clamping pad along with a pair of arcuately spaced radially inwardly extending gussets which are secured to the frame, thereby facilitating an additional lifting mechanism for the entire assembly. For added stability, the top portion of the bucket or vessel is reliably releasably secured to the frame by means of a "J" hook or claw which is adjustably positioned on an upright or vertical handle, with the claw engaging and restraining the vessel at a point adjacent the upper edge thereof, preferably being engaged with the handle receiving projections on the outer surface of the bucket. Optionally, the assembly may be provided with a shroud for carrying or holding tools, such as hand tools or of the like with the shroud being configured to fit within the cylindrical vessel. The vessel also provides a receptacle for debris as well as for articles useful for homeowners as well as tradesmen for home projects and similar applications.

7 Claims, 4 Drawing Sheets

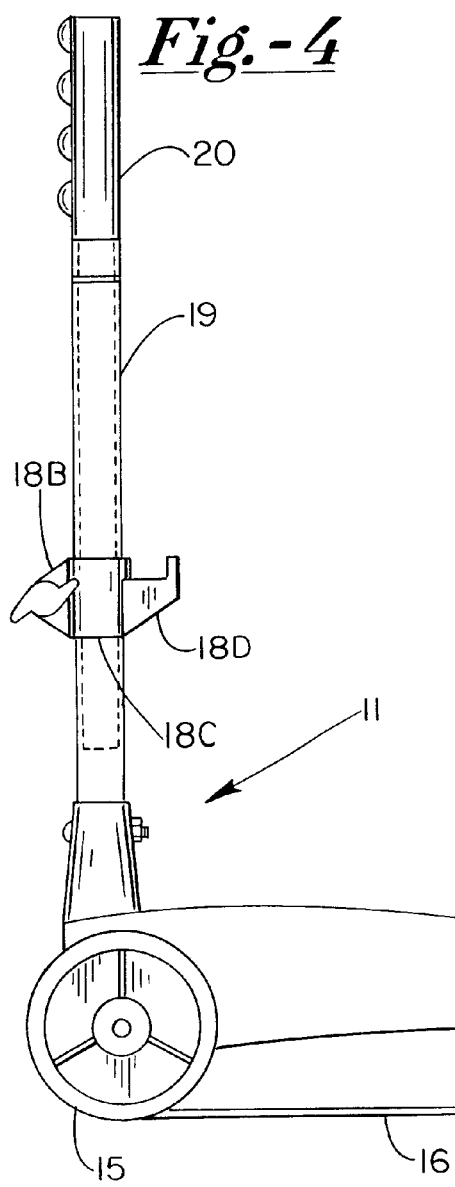
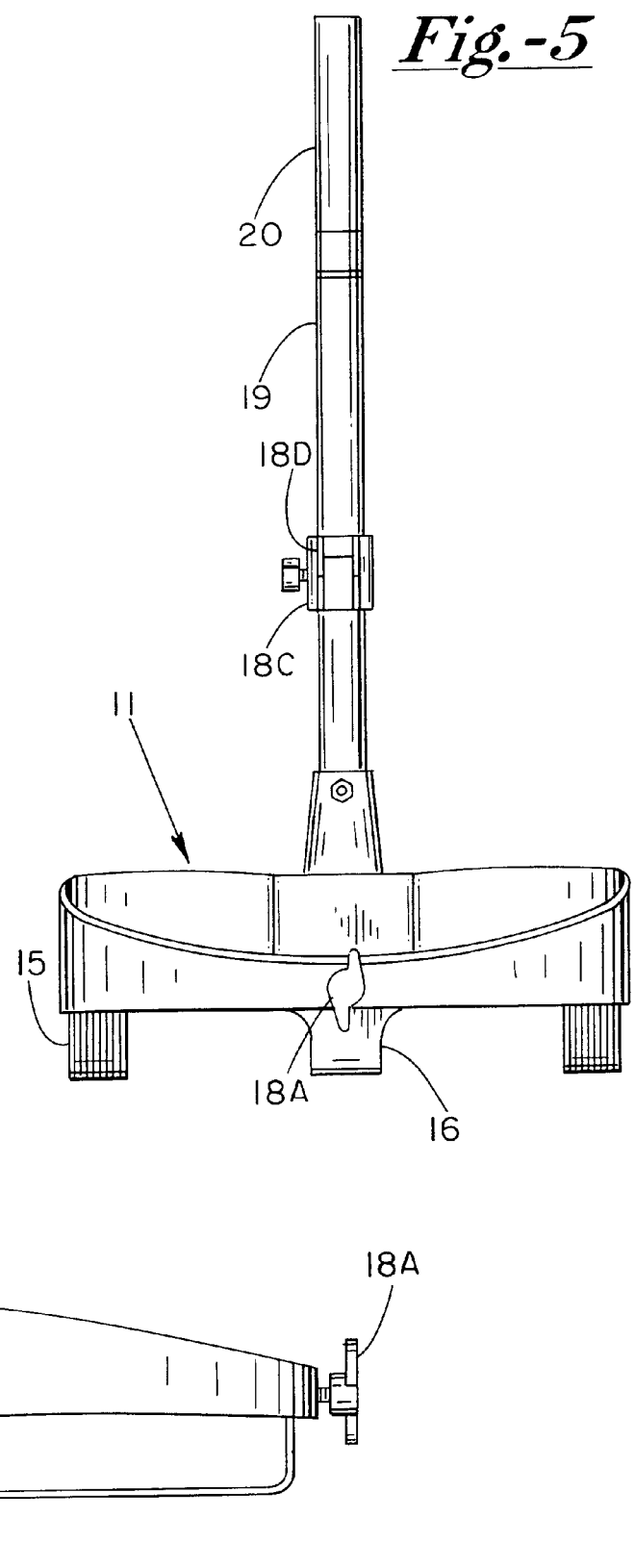

PORTABLE VESSEL RECEPTACLE

BACKGROUND OF THE INVENTION

The present invention relates generally to an improved portable bucket, container or vessel carrier, and more particularly to such a holder/carrier which conveniently and releasably secures, retains and supports a bucket, carrier or vessel thereon, so as to provide for added versatility in carrying and transporting the entire assembly. The bucket is preferably a bucket fabricated or formed of polyethylene, which is in itself deformable so as to provide additional advantages to the overall combination as set forth further hereinbelow.

The combination of the invention is designed for use by homeowners, gardeners, mechanics, or technicians as a vessel carrier and may optionally and additionally perform as a portable hand tool holder when equipped with a tool holder. The combination provides maximum flexibility in use; furnishing significant degrees of freedom of motion and carrying, with the bucket or vessel being transportable by either being wheeled on the carrier portion or lifted and carried by the bucket handle, with the bucket additionally being readily attachable and removable from the carrier. When equipped with a tool holder attachment, this attachment is in turn readily set in place and/or removed from the hollow open-top bucket or vessel. The tool holder comprises a pocketed cowl or shroud which fits over the hollow open-top vessel, with the pocketed cowl having separate hand grips.

The bucket or vessel itself is typically provided with its own separate handle for convenience in carrying for added portability to the combination, and also for ease in removal from the support frame. The support frame is preferably provided with a pair of wheels for added portability, utility, and convenience. This combination provides features which enable the user to quickly and easily move the entire combination of components or only selected portions thereof to desired work locations, while also providing a receptacle or container for receiving and holding working materials and also waste materials or trash.

In the past, various portable carrying devices have been designed for use by the handyman, gardeners, mechanics, and the like. These devices frequently are designed to carry vessels such as buckets or the like which may be transported from one location to another, and provide utility in that regard. On occasion, the load being carried for the contemplated task may be sufficiently light so as to permit the user to simply grip the carrying handle for the attached bucket and carry the entire assembly to another location to speed up the overall operation contemplated. On other occasions, the load being carried may be sufficiently heavy or awkward, so as to ordinarily require multiple trips between two spaced locations, and on such occasions, a wheeled support may be employed to ease and/or facilitate tasks. Additionally, with past known devices, the bucket may be held in place on a support frame through the use of heavy or complex hardware or, alternatively, light hardware without sufficient durability or strength to provide reliable retention. The present combination and arrangement provides a convenient and reliable means for transport and support, preferably through either a wheeled support with an articulating post or handle, or by the handle of the vessel receptacle or bucket being supportably attached in a cradle formed in the base of the wheeled frame.

The support for the deformable bucket includes an upper bucket engaging hook means for conveniently, reliably, and releasably securing the bucket or vessel to the handle portion of the frame. The upper bucket engaging or retention hook is designed to engage the bucket through the bucket handle attachment housing which is normally provided to couple the lifting handle or bale to the bucket. The base of the bucket is also releasably secured to the frame, being clamped into the frame by triangular forces created by a forwardly positioned clamping claw or pad assembly together with a pair of laterally positioned stationary triangular gussets disposed within or along a guide or base ring. By forcing or urging the forward pad rearwardly, the configuration of the base or lower portion of the bucket is deformed slightly so as to clampingly engage the bucket within the entire carrier assembly. In order to accommodate this additional flexibility, portability and freedom of use, the lifting handle of the bucket may be used to carry the entire assemble because of the clamping engagement with the support. Additionally, this feature renders the bucket easily removable from the wheeled support frame. As an additional item, and providing even additional flexibility, when a tool holding shroud or cowl is provided, it is also fitted with separate lifting handles and may be separately removed from the vessel for added flexibility, freedom, and portability.

SUMMARY OF THE INVENTION

Therefore, the primary object of the present invention provide an improved support for conveniently and reliably retaining a vessel or bucket on a portable support, preferably a wheeled support, with the combination further providing a convenient means for alternate ways of carrying and transporting the overall combination or assembly, as well as for storing and carrying hand tools, waste, debris, and the like. The overall combination has significant degrees of freedom and flexibility for transport and also for receiving or holding material in the portable vessel. The assembly may be employed for carrying hand tools, and for maintaining the tools in an orderly and accessible fashion and permitting their removal and utilization at various points where needed by the user.

It is the further object of the present invention to provide an improved portable support device for vessels or buckets, and optionally for storing, either on a temporary or long term basis, hand tools such as garden implements or the like. The combination includes a vessel or receptacle which is reliably secured and clamped within the frame support so as to provide a means of carrying the entire assembly, and at the same time the bucket is arranged to be readily removable from the frame support. The support is preferably a wheeled frame support, and with an optional pocket equipped cowl having receiving pockets therein being provided as a shroud fitting over the bucket or vessel. When utilized, the pocketed cowl is easily and readily added or removed from the vessel.

These and other objects and advantages of the present invention will be readily apparent to those skilled in the art from a review of the following detailed description of the preferred embodiment in conjunction with the accompanying claims and drawings in which like numerals in the several views refer to corresponding parts.

BRIEF DESCRIPTION OF THE DRAWINGS

FIGS. 4 and 5 are side elevational and front elevational views respectively of the support frame component of the present invention.

DESCRIPTION OF THE PREFERRED EMBODIMENT

Figure 1:
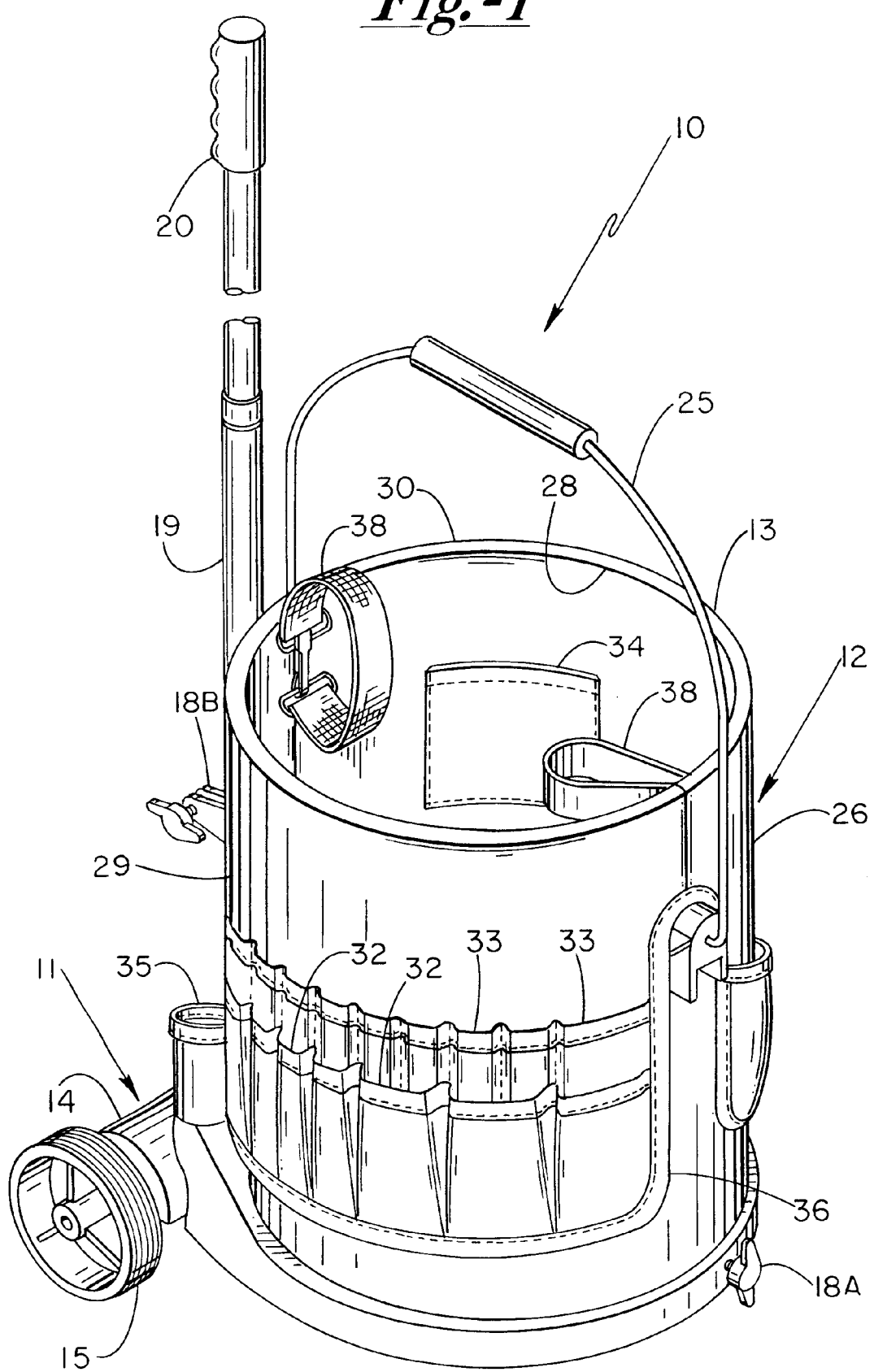
FIG. 1 is a perspective view of a tool bearing device of the present invention with this embodiment illustrating wheeled support frame upon which is releasable positioned and retained a nestled receptacle, with the vessel, in turn, being shown as provided with a tool receiving cowl.

In accordance with one preferred embodiment of the present invention, the vessel carrier as disclosed is shown is a combination vessel carrier and hand tool holder shown generally at 10 including a wheeled frame means 11 along with a vessel receptacle 12 positioned therewithin. As shown in FIG. 1, a tool retaining shroud or cowl 13 is provided, being in the form of a shroud covering both inner and outer walls of the vessel 12.

Figure 2:
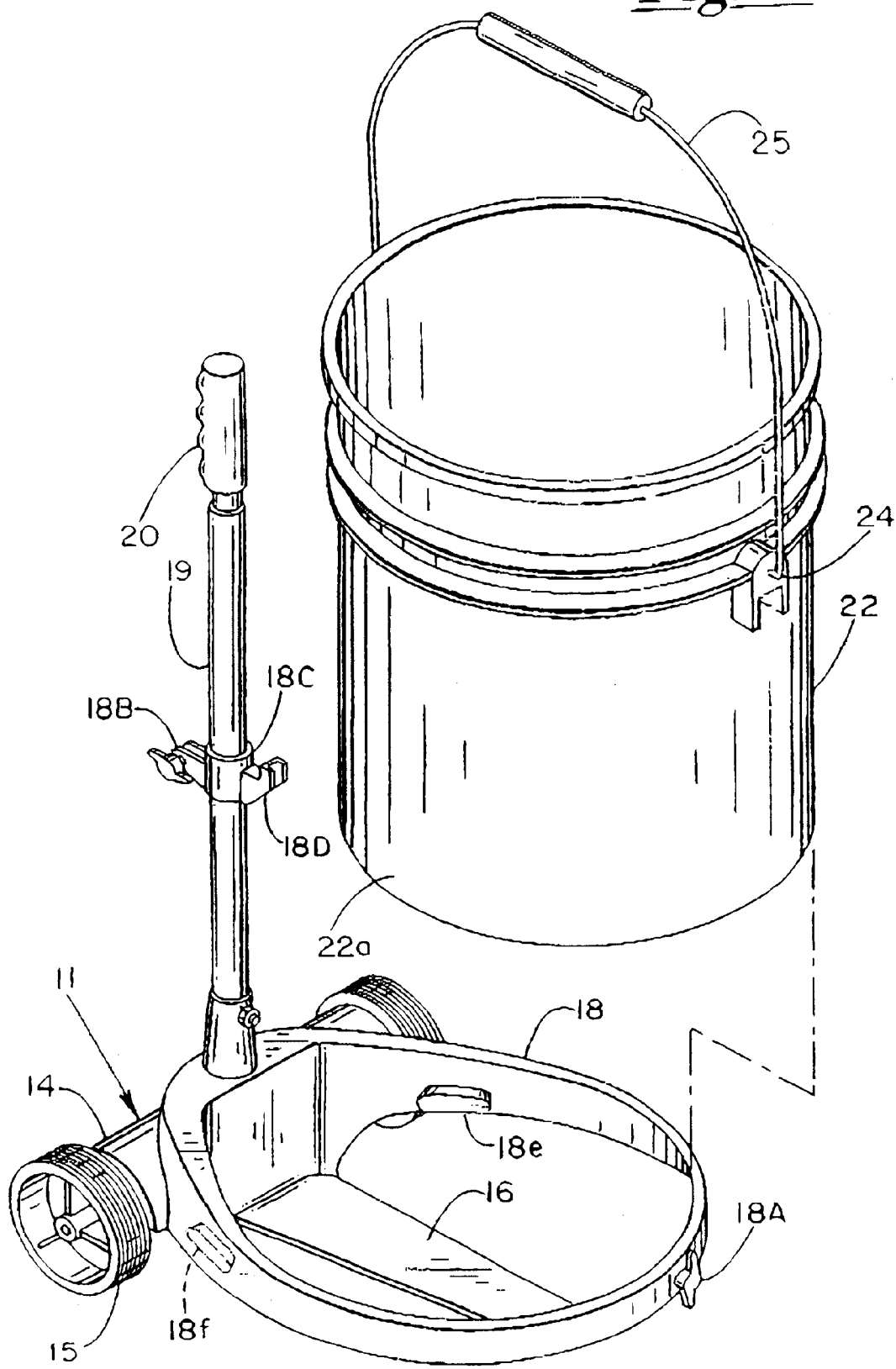
FIG. 2 is a view similar to FIG. 1, with the cowl removed, and with the bucket or vessel being shown in exploded view.
Figure 3:
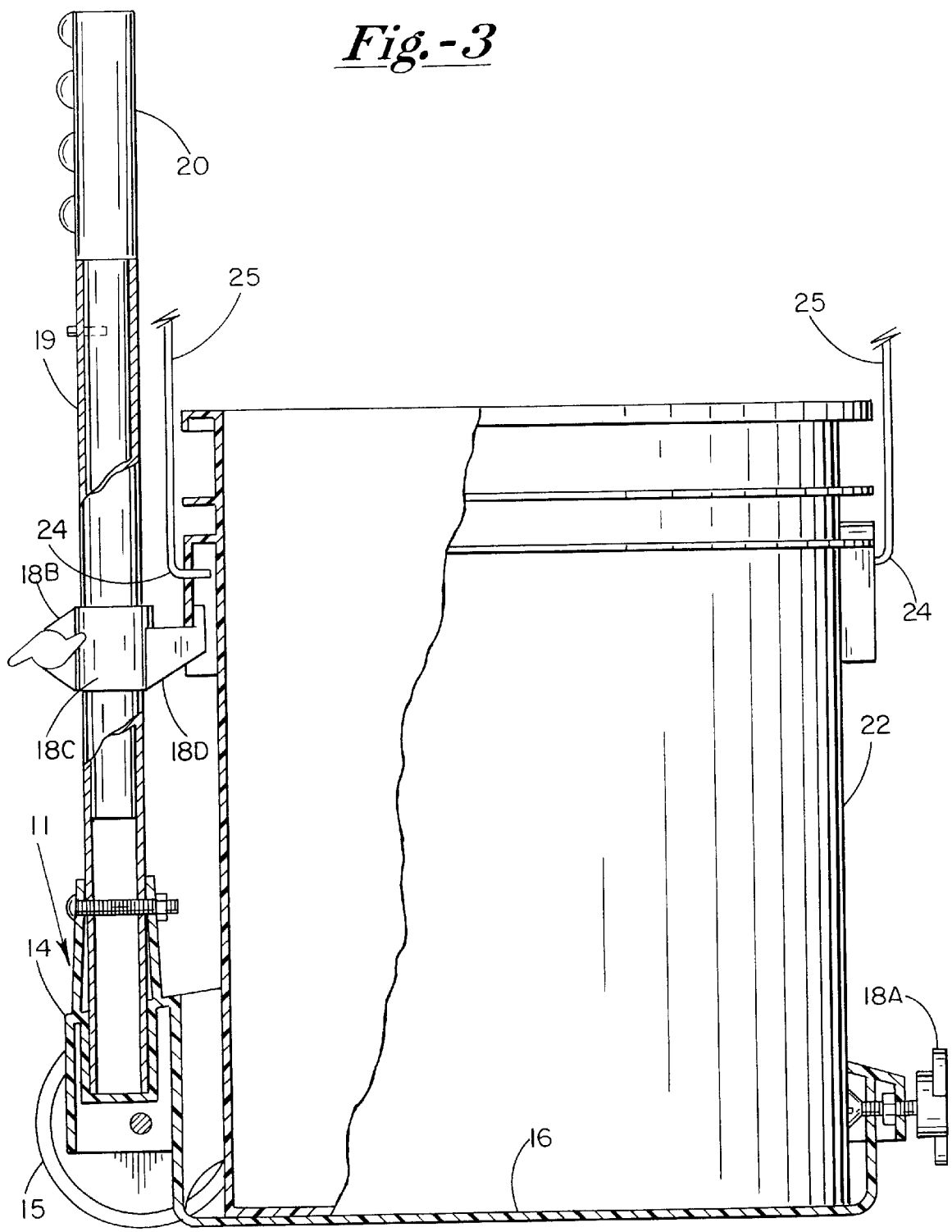
FIG. 3 is a side elevational view, partially in section, and illustrating the wheeled frame with the bucket or vessel receptacle held in place therein.

The frame support means includes a generally horizontally disposed housing or support 14, and in this embodiment support 14 is fitted with wheels 15 rotatably supported upon a suitable axle shaft or spindle. The frame means 11 further includes a generally horizontal support arm 16 which extends forwardly of member 14 and is also generally horizontally disposed. In actual use, it is designed to provide a base support pad or the like for the vessel receptacle 12. A lower stabilizing guide means in the form of a ring 18 is coupled to support 14, and is disposed slightly above the plane of the horizontal support arm 16. Guide or ring 18 is preferably further provided with threadibly engaged clamping pad or claw assembly as at 18A for clampingly engaging the base of vessel 12 to attach it to frame 11. Additionally, guide 18 is provided with a pair of inwardly projecting triangular gusset members 18E and 18F as shown in FIG. 2, which function to aid in the clamping engagement of the bucket 12 within the frame. When the clamping pad or claw 18A is advanced rearwardly and pressed into contact with the base of bucket 12, a triangular configuration or arrangement of forces is created which deforms the lower portion 22A of cylindrical wall vessel 22 inwardly at the contact points so as to firmly grip and hold vessel 12 within the guide or ring 18. In this way, the strength and durability of vessel 12 will provide support for the entire assembly when it is desirable to lift and transport the assembly by merely holding the gripping handle.

A generally vertically disposed articulating post is shown at 19, with post 19 having a gripping handle 20 at the upper distal end thereof. An upper vessel engaging claw or clamp is provided as at 18B, with clamp 18B being slidably and clampingly engaged on post 19 by clamping sleeve 18C. Slidable clamp 18B is provided with a forwardly extending "J" hook or claw 18D which is designed to engage the vessel 12 along its outer circumference, at a point adjacent the top. Vessels or buckets are commonly provided with a means for receiving the handle, such as bale gripping handle 25, with the outer surface of the bucket being provided with engaging projections 24—24 as indicated in FIG. 2. The handle engaging member has an overhanging portion or projection through which the device portion of the handle extends, with the "J" hook or claw being designed to engage this overhanging portion. Alternatively, when appropriate, the "J" hook or claw 18D may be utilized to engage the overhanging lip portion at the top of the open vessel or bucket. Claw 18D is provided in order to engage and releasably secure vessel 12 to frame 14 at a point adjacent the top handle engaging projection or ear, as described.

The vessel or tool bearing receptacle includes the generally cylindrical walled vessel shown at 22, with vessel 22 having an open top, and with handle engaging projections 24—24 as previously indicated being disposed in diametrically opposed relationship on vessel 22. A tool carrying cowl with inner and outer generally concentric generally wall engaging surfaces is optionally provided and designed to be draped over the cylindrical wall of the vessel receptacle. This cowl is preferably fabricated from a woven cloth or fabric material with sufficient durability to withstand the rigors of the completed tasks. Such fabrics are, of course, well known to those with conventional wisdom in the art and can be appropriately selected. Each of the wall engaging surfaces of cowl 26 including inner surface 28 and outer surface 29, separated by top edge engaging surface 30, are provided with exposed tool carrying pockets circumferentially there around. These pockets are illustrated at 32—32 and 33—33, with an inner pocket being illustrated Additionally, a loop receptacle is shown at 35 for carrying and supporting, for example an implement or tool having a hand gripping handle thereon.

In order to facilitate appropriate draping of cowl 26 over vessel 12, slotted areas are provided as at 36 in order to accommodate and receive ears or projections as at 24—24. With continued attention being directed to FIG. 1 of the drawings, cowl 26 is provided with gripping handles 38—38 in order to permit its removal from vessel 26.

THE FUNCTION OF THE GUSSETS AND CLAMPING PAD

As indicated above, clamping pad or assembly 18A together with gussets 18E and 18F provide a strong and reliable retention means for vessel 12 within the assembly. As indicated, the cylindrical wall 22A is preferably and typically fabricated of polyethylene, which is, of course, deformable under modest pressures at normal ambient temperatures. By placing the bucket or vessel 12 within the assembly, and thereafter advancing the clamping pad of assembly 18A rearwardly, the triangulation of forces created on the base portion of the bucket provides a secure and reliable means for permitting the bucket 12 to be utilized as an added degree of flexibility of transport. Thus, when the overall load is sufficiently light and the person handling the load is able, the entire assembly may be carried by simply carrying the assembly by the bale handle 25. Such an arrangement, as indicated above, provides added flexibility and reliability of use.

GENERAL COMMENTARY

By way of modified features, it would appreciated that while guide 18 is shown as circular, a semi-circular arrangement may also be employed with appropriately positioned or disposed clamping means being provided for engagement with the flexible walled bucket. Suitable handle arrangements may also be attached thereto if desired.

As indicated hereinabove, the arrangement of the present invention provides a means for facilitating ease of handling and manipulating a bucket or vessel, which is designed for any of a variety of conventional tasks. These tasks may include cleaning, dry wall preparation and finishing, painting, as well as a host of other uses. Also, the device may be provided with a tool carrying or receiving capability, with the tool receiver having a number of degrees of flexibility and freedom of utilization. When a removable tool receiving cowl is present, it may be lifted freely from the bucket or vessel, and with the vessel, in turn, being releasably retained within the wheeled frame. Clamping means are appropriately provided in order to permit the vessel to be reliably, safely and releasably retained within the frame for transport purposes, while at the same time permitting its easy removal.

It will be appreciated that the above examples are given for purposes of illustration only, and that the various departures may be made from the specific features without departing from the spirit and scope of the present invention.

What is claimed is:

1. A portable bucket and vessel carrier and receptacle comprising a combination of a vessel and a frame means, the combination comprising:

(a) a vessel receptacle support comprising frame means including a generally horizontal base pad, a generally horizontal arm extending forwardly of said base and a generally horizontally disposed vessel stabilizing guide means disposed upwardly of said horizontal support arm;

(b) a generally vertically disposed articulating post secured to said frame means and having a gripping handle at the upper distal end thereof;

(c) said vessel comprising a generally cylindrical walled container with a closed bottom and an open top and with a downwardly extending projection integral with said cylindrical wall and in radially outwardly disposed relationship to said outer cylindrical surface, and carrying handle means secured to said cylindrical wall;

(d) a generally "J" shaped hook slidably coupled to said articulating post and projecting forwardly thereof for engaging said vessel at said downwardly extending projection; and (e) a positionally adjustable clamping pad and at least two radially inwardly extending gusset means arranged in arcuately spaced relationship within said guide means for releasably clampingly engaging the cylindrical wall of said cylindrical walled container for rigid support of the vessel within said guide means, such that said hook, said clamping pad, and said gusset means, in combination, sufficiently secure said vessel to said frame means so that the combination vessel and frame means may be lifted and carried by said carrying handle means.

2. The combination of claim 1 wherein said adjustable clamping pad operably applies a force against said cylindrical wall container so as to deform the lower portions of said cylindrical walls.

3. The combination of claim 1 wherein said radially inwardly extending gussets and pad provide a triangulation of forces against said cylindrical wall container.

4. The combination of claim 1 wherein said vessel includes a pair of handle engaging projections of diametrically opposed relationship on the outer surface of said cylindrical wall, and wherein said downwardly extending projection is integral with said handle engaging projections.

5. The combination set forth in claim 1 in which said radially inwardly extending clamping pad and gusset means are coupled to said vessel stabilizing guide means for releasably retaining the bottom wall portion of said vessel receptacle within said frame means.

6. A portable bucket carrier and receptacle comprising in combination, a bucket, a support frame, and a tool receiving cowl for releasably retaining hand tools there within, the combination comprising:

(a) a vessel receptacle support comprising frame means including a generally horizontal base pad, a generally horizontal arm extending forwardly of said base and a generally horizontally disposed vessel stabilizing guide means disposed upwardly of said horizontal support arm;

(b) a generally vertically disposed articulating post secured to said frame means and having a gripping handle at the upper distal end thereof;

(c) said vessel comprising a generally cylindrical walled vessel with a closed bottom and an open top and with a pair of handle bale engaging ear projections in diametrically opposed relationship on the outer surface of said cylindrical wall, and carrying handle means integral with said ear projections;

(d) a generally "J" shaped hook slidably coupled to said articulating post and projecting forwardly thereof for engaging said vessel adjacent the upper open end thereof;

(e) a positionally adjustable clamping pad and a pair of radially inwardly extending gusset means arranged in arcuately spaced relationship within said guide means for clampingly engaging the cylindrical wall of said cylindrical walled container for rigid support within said guide means;

(f) said cowl comprising an annular shroud with inner and outer walls and arranged to be draped over said bucket; and (g) hand gripping handles secured to said cowl adjacent the upper edge lip surface thereof where said cowl bridges said inner and outer concentric walls, such that said hook, said clamping pad, and said gusset means, in combination, sufficiently secure said vessel to said frame means so that the combination vessel and frame means may be lifted and carried by said carrying handle means.

7. The combination as defined in claim 6 being particularly characterized in that the outer wall engaging surface of said cowl has slotted zones formed therein for accommodating said ear projections.

* * * * *